March 10, 1953 — A. R. MORRILL — 2,630,589
SHOE FEEDING AND POSITIONING MECHANISM
Original Filed May 15, 1946 — 9 Sheets-Sheet 7

Witness
Jas J Maloney

Inventor
Alfred R. Morrill, Dec'd
Ruth W. Morrill, Adm'x
by her Attorney
Maxwell Fish March 10, 1953 — A. R. MORRILL — 2,630,589
SHOE FEEDING AND POSITIONING MECHANISM
Original Filed May 15, 1946 — 9 Sheets-Sheet 9

Fig.11

Witness
Jas. J. Maloney

Inventor
Alfred R. Morrill, Dec'd
Ruth W. Morrill, Adm'x
by her Attorney
Maxwell Fish Patented Mar. 10, 1953

2,630,589

UNITED STATES PATENT OFFICE 2,630,589

SHOE-FEEDING AND POSITIONING MECHANISM

Alfred R. Morrill, deceased, late of Woodstock, Vt., by Ruth W. Morrill, administratrix, Woodstock, Vt., assignor to United Shoe Machinery Corporation, Flemington, N. J., a corporation of New Jersey Original application May 15, 1946, Serial No. 669,830. Divided and this application October 27, 1948, Serial No. 56,768

7 Claims. (Cl. 12—17.2)

The present invention relates to improvements in machines for operating about the sole margin of a shoe while supported upon a last, and more particularly to improvements in shoe feeding and positioning mechanism in a machine of this general description.

The invention is shown as embodied in an automatic machine of the type in which the shoe is supported on a jack and in which the shoe operating means, which in the illustrated form of the invention include shoe sewing, trimming and side lasting devices, and the jack are moved relatively to transfer the point of operation about the shoe and to change the relative position of the shoe and said operating means to cause the shoe to be presented properly to the operating means as the point of operation is transferred about the shoe, all of the relative movements of the shoe and said operating means being produced and controlled by automatically acting mechanisms.

The shoe machine generally illustrated and referred to as embodying in a preferred form the several features of the invention, is fully illustrated and described in applicant's copending application for Improvements in Shoe Machines, Serial No. 669,830, filed May 15, 1946 and issued as Patent No. 2,529,095, November 7, 1950, of which the present application is a division. Only so much of the machine is here shown as is believed necessary to indicate the connection of the present invention therewith.

It is an object of the invention to provide in a machine having shoe operating and feeding devices including a feed lever and operating connections therefor for transferring the point of operation about the sole margin of a shoe, a novel and improved mechanism for imparting an added increment of feeding movement to the feed lever and shoe relative to the operating devices. In the illustrated form of the invention the feed lever is actuated to feed the shoe for the performance of a further operation upon the shoe after the machine has stopped.

It is another object of the invention to provide a novel construction and arrangement of a shoe inseam trimming mechanism and a shoe positioning mechanism associated therewith to cause the end portions of the inseam abutting the heel to be trimmed at a relatively high level, while permitting a relatively close setting of the trimming cutter to trim the intermediate portions of the inseam.

A feature of the present invention consists in the provision of an improved device for imparting an added increment of feed to the supported shoe which includes, in combination, an extensible link connection with the feed lever, an actuating member supported co-axially with the feed lever on the pivotal support for the feed lever, an operating connection on the feed lever between the actuating member and extensible link connection, and control means on the machine for operating the actuating member. In the illustrated form of the device, the connections above described are employed to cause the feed lever and shoe controlled thereby to be advanced a small amount after the jack actuating mechanism has stopped, in order to further advance the shoe with relation to the shoe operating mechanism.

A further feature of the invention consists in the construction and arrangement of the shoe feeding and positioning devices, particularly with relation to the mechanism for controlling the position of the shoe with relation to the inseam trimming cutter in order to vary the depth of the inseam trimming cut during the transfer of the operation about the sole margin of the shoe. Specifically, mechanism is provided for effecting a relative downward movement of the channel guide relative to the inseam trimming cutter as the inseam trimming operation nears completion at the breast line of the heel, and in which the channel guide is caused again to move gradually upwardly to its normal operating position during the first portion of a new trimming operation extending from the breast line of the heel. The operation of the shoe positioning and trimming mechanisms as above described, is found to be a substantial improvement in that it permits the beginning and end portions of the inseam to be trimmed high.

The several features of the invention consist also in the devices, combinations and arrangement of parts hereinafter set forth which, together with the advantages to be attained thereby, will be readily understood by one skilled in the art from the following description taken in connection with the accompanying drawings, in which.

The shoe machine illustrated in the drawings as embodying in a preferred form the several features of the invention, is an automatic machine adapted for performing simultaneously a plurality of related operations on the shoe as the point of operation is transferred about the sole margin of the shoe. The machine is provided with a shoe supporting jack and supporting and actuating mechanism for the jack adapted for imparting turning, tipping and feeding movements to the jacked shoe to present the shoe properly to the several operating instrumentalities grouped at or adjacent to the point of operation, and to transfer the operation of said instrumentalities about the shoe. The operating mechanisms referred to include specifically a chainstitch shoe sewing mechanism having a curved hook needle 120 movable in the line of feed, an oscillatory looper 122 and a thread finger 124, a rotary tubular inseam trimming knife 130, and a lasting gripper mechanism comprising a gripping member 132 supported to move downwardly between the last and upper, and a gripper member 134 cooperating therewith to engage and draw in the successive portions of the shoe upper for the operation of the sewing mechanism.

The jacked shoe is guided in position with relation to the several operating devices during the transfer of the operation about the sole margin of the shoe by means of a channel guide 138 which is arranged to ride in a stitch receiving channel and support the shoe against the needle, and the cooperating welt guide designated at 140 which yieldingly engages against and is periodically locked against the outer edge of the shoe.

In the illustrated machine, the shoe supported on a last is mounted on the shoe supporting jack which may be of well known construction as that, for example, illustrated in the patent to Cross No. 2,056,714, dated October 6, 1936. The jack indicated generally by the reference character 141 comprises a toe supporting arm 142 rigid with a spindle 144 and a heel supporting arm (not shown) pivoted at is lower end on the upper end of the spindle 144. The jack is carried on a forwardly extending arm 148 forming part of the automatic supporting and actuating mechanism for the jacked shoe.

Figure 1:
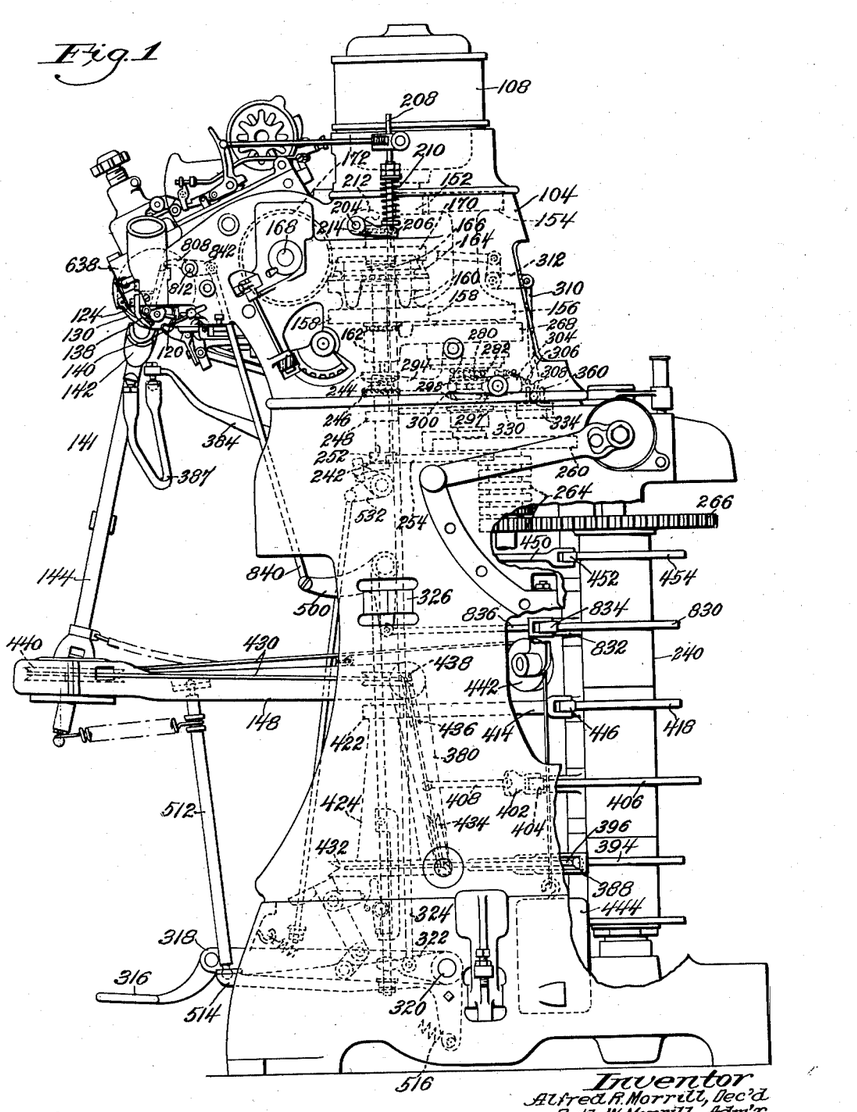
Fig. 1 is a view in right-side elevation of an automatic shoe machine embodying therein several features of the invention, portions of the casing being broken away to illustrate underlying parts.

The driving and stopping mechanism of the machine, as best shown in Fig. 1 of the drawings, comprises the electric motor 108, the armature of which carries a gear 152 which meshes with a gear 154 carried on a sleeve element together with a second gear 156, so that the two gears turn as a unit. The eccentric drive shaft of the machine indicated at 157 (Figs. 6 and 7) is mounted directly beneath the gears 154, 156 and is connected to be driven therefrom by means of a planetary transmission. The gear 156 meshes with a gear 158 formed integrally with an external coned clutch member 160 which is mounted between end thrust ball bearings on a vertical shaft 162 and forms the driving element of the main driving clutch of the machine. These parts are driven continuously.

The cooperating driven element of the main driving and stopping clutch comprises an internal coned clutch member 164 keyed to turn with and to slide on the drive shaft. A compression spring 166 interposed between the driving and driven elements of the clutch tends normally to move the driven clutch member 164 upwardly to disengage the clutch. The driven member 164 of the main starting and stopping clutch is arranged through its splined connection with the vertical drive shaft 162 to drive the pattern mechanism of the machine including the pattern cam shaft. The driven clutch member is also connected to drive the sewing cam shaft of the machine designed at 168 through the meshing engagement of a spiral gear 170 formed on the outer periphery of the driven clutch member 164 with a spiral gear 172 secured to the sewing cam shaft 168.

In stopping the machine, the sewing cam shaft is first brought to a gradual stop in a predetermined angular position and then is driven through a predetermined distance in a reverse direction to a predetermined angular stop position by means of slow speed reverse driving connections and a friction clutch mechanism on the sewing cam shaft. The sewing cam shaft stopping and reversing clutch mechanism is arranged to be thrown into operation as the main clutch 164 is disengaged in stopping the machine. This mechanism is substantially similar to that illustrated and described in applicant's prior Patent No. 2,359,664. Since this mechanism forms specifically no part of the present invention, no further description thereof is believed necessary.

The mechanism for controlling the operation of the main stopping and starting clutch 164, as best shown in Fig. 1, comprises a rock shaft 204 extending transversely of the machine and provided at its right hand end with a forked lever arm 206 which straddles a vertically extending treadle rod 208 and engages beneath a compression spring 210 coiled about the treadle rod 208. The spring 210 is seated at its upper end against a collar fixed to the treadle rod. A forked clutch controlled lever 212 rigidly secured to the rock shaft 204 is arranged to bear against a thrust bearing 214 seated against the upper end of the sleeve hub of the main starting and stopping clutch member 164, and is rendered operative by a downward movement of the treadle rod to engage the main clutch. The rocking of shaft 204 acts also through connections, not specifically shown, to initiate the operation of the sewing cam shaft stopping and reversing clutch mechanism above referred to.

Figure 7:
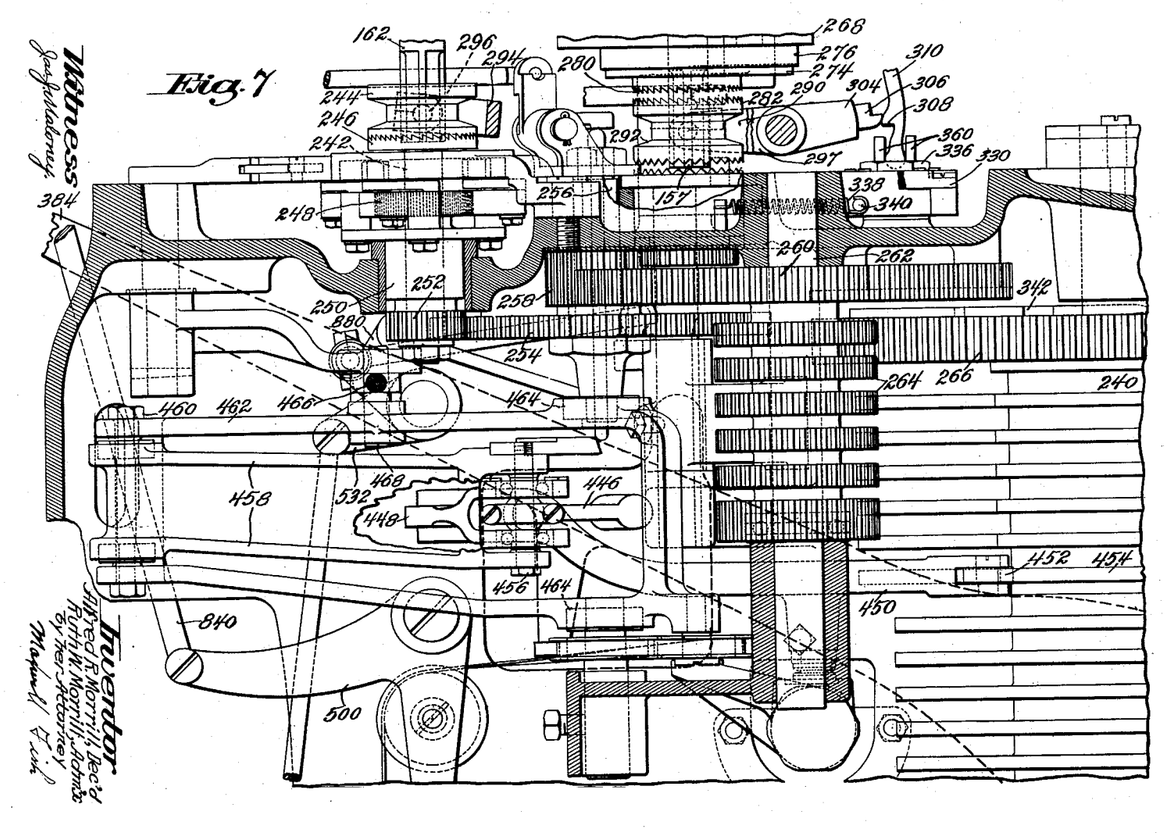
Fig. 7 is a view in right-side elevation of the upper portion of the machine base taken on the line 7—7 of Fig. 6 with the casing broken away and sectioned to illustrate particularly the mechanism shown in Fig. 6.

The pattern shaft of the machine generally designated at 240 is driven from the main starting and stopping clutch through connections which include the clutch member 164 and vertical driving shaft 162, a secondary clutch, a variable speed mechanism and a reduction gear train which may be of ordinary description. As best shown in Figs. 1 and 7, the drive shaft 162 is connected at its lower end through a ratchet toothed clutch to drive a stud shaft 242 in axial alignment therewith. The secondary clutch referred to comprises a driven clutch element 244 keyed to turn and to slide axially upon the drive shaft 162 for engagement with a cooperating clutch member 246 fast on the shaft 242 to which is secured a driving ratchet 248 (see Fig. 7) forming part of the variable speed driving mechanism for the pattern cam shaft 240. Since this variable speed driving mechanism is well known in the art, no specific description of it is believed necessary. The driven element of the variable speed mechanism comprises a downwardly extending sleeve member 250 which is connected by reduction gearing generally indicated in Fig. 7 to drive the pattern shaft 240 and includes a gear 252 formed in the lower end of the sleeve 250, and a gear 254 meshing therewith carried on a stud shaft 256. Thence the drive is taken through a gear 258 on the stud shaft 256 which meshes with a gear 260 on a vertical drive shaft 262. Also mounted on the shaft 262 are a number of driving gears 264 which mesh with a gear 266 on the pattern shaft 240 in any of its vertically adjusted positions.

The drive for the one revolution eccentric which is employed in stopping the machine to perform a number of auxiliary operations, and the reverse drive for the pattern cam shaft 240 are taken from the lower end of the vertical drive shaft 157 which as above noted is continuously driven from the sleeve unit including gears 154, 156 and a planetary gear train carried in a housing 268. An eccentric cam 274 fitted with an eccentric strap 276 (Figs. 6 and 8) is loosely sleeved to turn on a bushing support 278 for the shaft 157 and is provided with ratchet-shaped clutch teeth 280 for engagement with an eccentric and reverse driving clutch member 282 which is keyed to turn with and to slide axially upon the shaft 157. Upward movement of the eccentric clutch member 282 to the engaging position with clutch teeth 280 causes the eccentric 274 to be driven from the drive shaft 157.

The mechanism for controlling the positions of the eccentric and reverse driving clutch member 282 and of the pattern cam shaft secondary clutch 244 is similar to that shown in the inventor's prior Patent No. 2,359,662, including a forked clutch shifting lever 290 (see Fig. 7) having rollers which engage in an annular groove 292 in the eccentric clutch member 282. A second clutch shifting lever 294 carries rollers 296 which engage in an annular groove in the clutch member 244.

Under normal operating conditions of the machine, the position of the clutch shifting lever 294 and pattern cam shaft secondary clutch 244 are determined in accordance with the position of the eccentric clutch shifting lever 290 by means of an actuating connection from the sleeve hub of the lever 290 which comprises a forwardly extending lever arm 297 formed on the sleeve hub and provided at its forward end with a laterally extending roller 298 which engages in a V-shaped notch 300 formed in a downward extension of the auxiliary clutch shifting lever 294 (see Fig. 1).

In stopping the machine, the clutch lever 290 is rocked to cause the eccentric clutch member 282 to engage with and positively drive the eccentric through one revolution, while at the same time the roller 298 moves outwardly from the center of the notch 300, forcing the clutch shift lever 294 upwardly to disengage the secondary pattern cam shaft clutch 244. This operation is effected by means of connections which include a rearwardly extending lever arm 304 associated with the eccentric clutch lever 290 (see Fig. 7), a notched detent member 306 carried by the arm 304, and a vertically movable clutch control rod 310 connected to be moved upwardly and then down by the sewing mechanism reverse stop motion mechanism. Inasmuch as these parts are well known in the art and form specifically no part of the invention, further description thereof is omitted.

The starting of the machine, as previously pointed out, is effected by a downward movement of the treadle rod 208 which rocks the shaft 204 to engage the main clutch 164 and to withdraw the lock bolt 190. This movement is effected through actuating connections including a foot treadle 316 carried on the forward end of a treadle lever 318 in the machine base (Fig. 1). The treadle lever 318 is secured at its rear end to a transversely extending rock shaft 320 which also carries a forwardly extending lever arm 322 to which is pivoted the lower end of a vertically extending connecting rod 324, which operates through connections not specifically shown to control the position of the treadle rod 208. Downward movement of the lever 326 with the foot treadle 316 will act to depress the treadle rod 208. The treadle rod is then held in its depressed operating position by the engagement of the forward end of a latch bar 330 with a notch 332 in the treadle rod 208 (Fig. 6).

The illustrated machine is stopped automatically upon the completion of the sewing operation about the margin of the shoe sole, by means of mechanism forming part of the stop motion of the machine which acts to withdraw the latch bar 330 from engagement with the notch 332 in the treadle rod 208, and thereby permits the opening of the main clutch 164 and the setting in operation of the sewing machine stopping and reversing mechanism.

Figure 6:
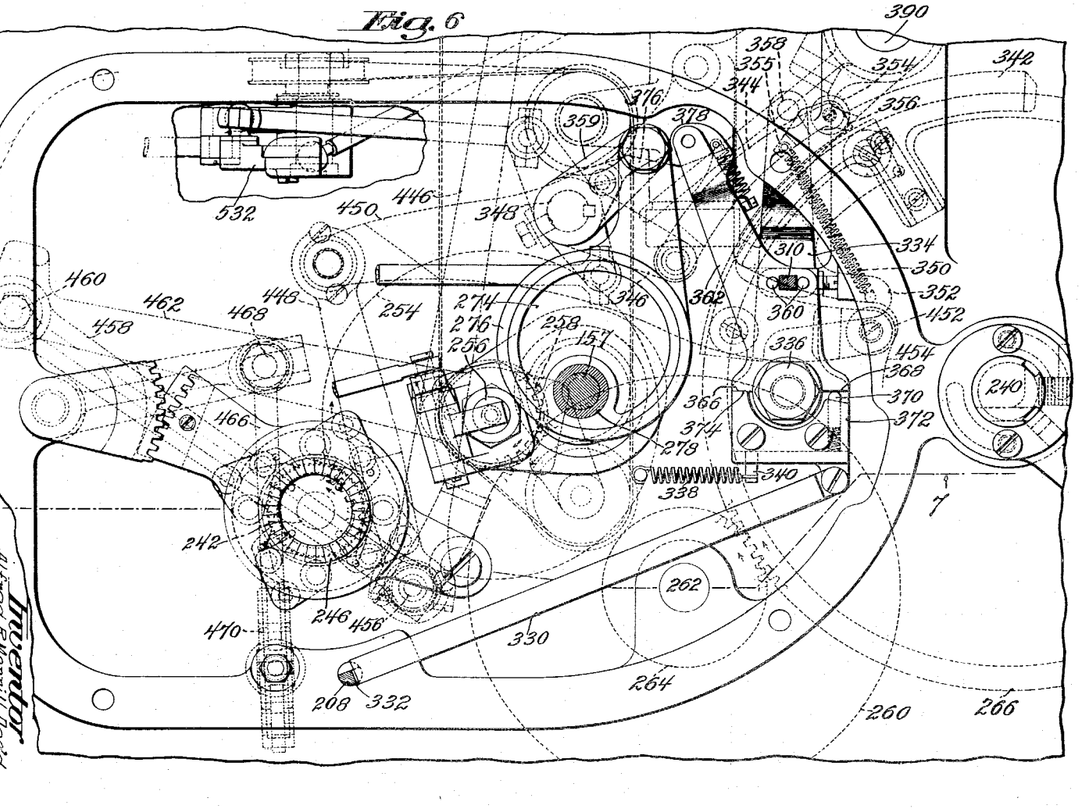
Fig. 6 is a sectional plan view of the machine taken through the upper portion of the base.

As indicated in Fig. 6 the latch bar 330 is pivotally connected at its rear end with a treadle rod release lever 334 which extends laterally of the machine, and is loosely mounted to turn on a vertically extending pivot shaft 336. A tension spring 338 connected at one end to a pin 340 on the treadle rod release lever 334 and at its other end to a point on the machine frame, tends to move the lever 334 in a direction to engage the latch bar 330 with the notch 332 in the treadle rod 208.

The mechanism for automatically throwing the stop motion into operation is actuated directly from the pattern cam shaft 240 after it has made nearly a complete revolution. To secure this result, a block 342 (see Fig. 6) is secured to the upper surface of the gear 266 at the upper end of the pattern cam shaft, which block after the pattern cam shaft has made nearly a complete revolution, engages with a wide-faced pawl 344 pivoted to a laterally extending arm 346 of a vertically disposed eccentric rock shaft 348, and moves said pawl outwardly from the gear 266 against the pressure of a tension spring 350 connected between the pawl 344 and a horizontally disposed plate 352 forming part of the machine frame. A roller 354 mounted on the upper edge of the pawl 344 is arranged for engagement with the edge of the fixed plate 352 to limit the movement of the pawl toward the gear 266 under the influence of spring 350. The outward movement of the pawl causes a cam surface 355 formed on a fixed projection 356 of the pawl 344 to engage with a cam roll 358 on the treadle release lever 334, moving the treadle release lever positively in a counterclockwise direction to withdraw the latch bar 330 from engagement with the treadle rod 308. The main clutch is now permitted to open, and the sewing machine reverse stop motion is thrown into operation causing an upward and downward movement to be imparted to the eccentric clutch control rod 310 (see Figs. 1 and 7) to engage the eccentric clutch 282 with the eccentric 274 which is now driven through one revolution to impart a clockwise followed by a counterclockwise rocking movement to the eccentric rock shaft 348. In order to effect this movement, the eccentric strap 276 (see Figs. 6, 7) is provided with a lateral extension which is pivotally connected to a lever arm 359 secured to the upper end of the eccentric rock shaft 348.

In order that the vertical reciprocating movement of the eccentric clutch control rod 310 may be rendered operative to engage the clutch, and also to provide means for subsequently disconnecting the eccentric drive after one revolution of the eccentric 274, the eccentric clutch control rod 310 is connected at its lower end to be swung forwardly and rearwardly about its pivotal connection with the bell-crank lever 312. As best shown in Figs. 1, 6 and 7, the lower end of the eccentric control rod 310 is slidably engaged between two vertically extending pins 360 on a laterally extending eccentric control lever 362. The lever 362 is supported to turn on the fixed pivot 336 directly above the treadle release lever 334, and is connected to have only a limited movement with relation thereto. To this end the eccentric control lever 362 has formed on opposite sides of the hub portion thereof, shouldered portions 366, 368, the shouldered portion 368 being engaged by a spring-pressed plunger 370 carried in a block 372 secured to the upper side of the treadle release lever 334 which serves to maintain the shouldered portion 366 in yielding engagement with an abutting shoulder 374 on the block 372. During the rocking movement of the treadle release lever 334 to its release position, the associated eccentric control lever 362 is biased also in a forward direction by the action of the spring-pressed plunger 370, so that during the subsequent upward movement of the eccentric control rod 310, this rod will be swung forwardly to engage the notch 308 with the notched portion 306 of the rearwardly extending arm 304 forming part of the eccentric clutch shifting lever.

Connections are provided which are rendered operative by the rocking movements imparted to the eccentric rock shaft 348 to shift the eccentric control lever 362 rearwardly against the pressure of the plunger 370, and thereby to disengage the eccentric clutch 282 at the completion of one full revolution of the eccentric. The connections for effecting the disengagement of the eccentric drive comprise a short lever arm 376 on the eccentric rock shaft 348 which during the clockwise rotational movement of the eccentric rock shaft moves said pawl outwardly but passes a yieldingly supported detent 378 on the eccentric control lever 362, and thereafter on its return movement in a counterclockwise direction as the eccentric completes one full revolution, positively engages the detent, thereby shifting the eccentric control lever 362 rearwardly, thus disengaging the eccentric control rod from the clutch shifting lever, and permitting the eccentric clutch 282 to return to its intermediate neutral position.

The rocking movement of the eccentric rock shaft 348 has for one of its functions to complete the rotation of the pattern cam shaft. During the clockwise movement of the eccentric rock shaft 348, the pawl 344 is withdrawn to a position in which the pawl rides off of the rear end of the block 342, and the fixed projection 356 is positioned behind the same. During the subsequent counterclockwise rotation of the eccentric rock shaft, the pawl 344 is rendered operative to continue the rotation of the pattern cam shaft to its initial starting position.

Figure 11:
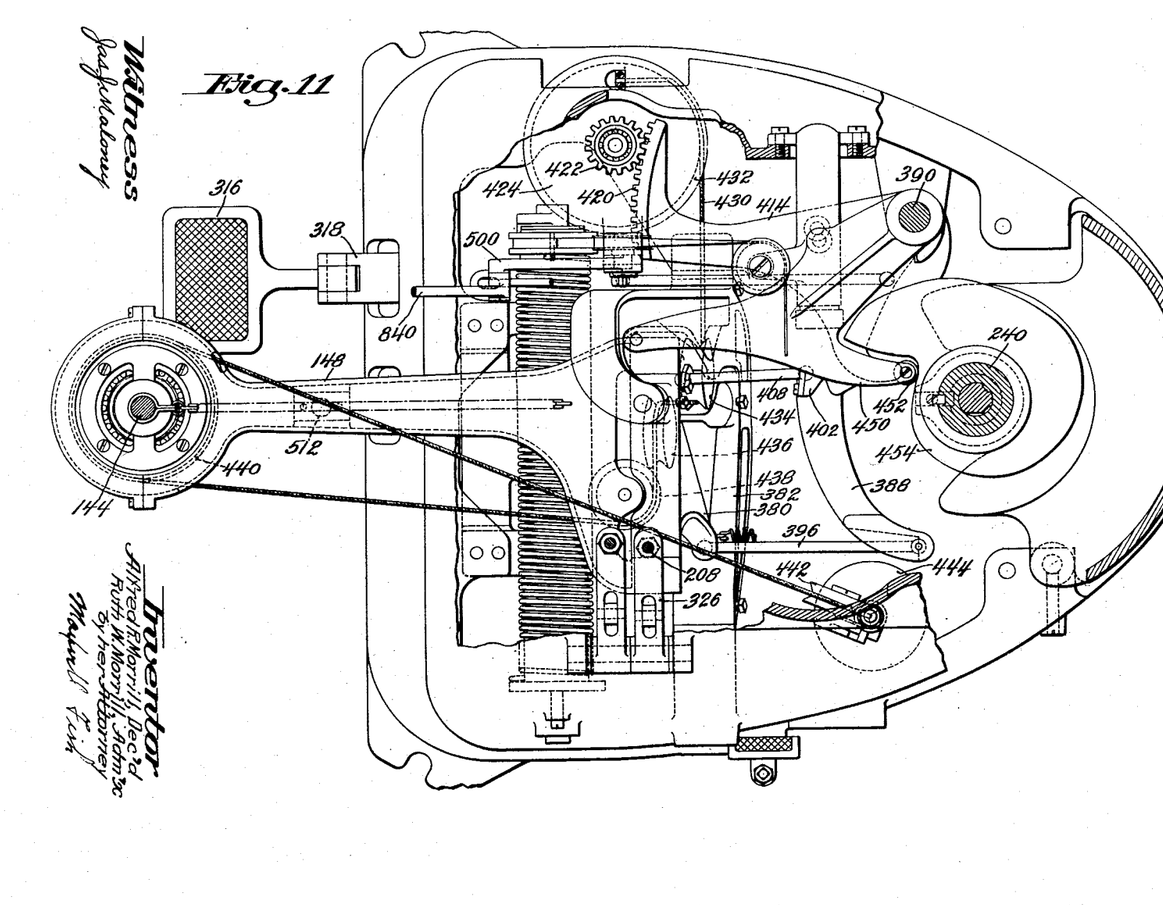
Fig. 11 is a sectional plan view taken through the base illustrating particularly the supporting and actuating devices for the jack.

The shoe supporting jack comprising the toe support 142, heel support and spindle 144, are mounted for turning, tipping and feeding movements on a lever supporting assembly which, as generally indicated in Fig. 11, includes the forwardly extending arm 148, a pitch supporting lever 380 on which the arm 148 is mounted to swing vertically, and a roll support lever or frame 382 pivotally mounted at its lower end in the machine base so as to be capable of swinging about a horizontal axis, and upon which the support lever 380 is mounted so as to swing about a substantially vertical axis. These parts are so arranged as to permit free rotational movement of the jack and spindle 144 relative to the arm 148 on their supporting gimbels, and for imparting forward and back or roll tipping movements and longitudinal or pitch tipping movements to the jack to properly position the shoe with relation to the shoe operating devices as the point of operation is transferred about the shoe.

Figure 2:
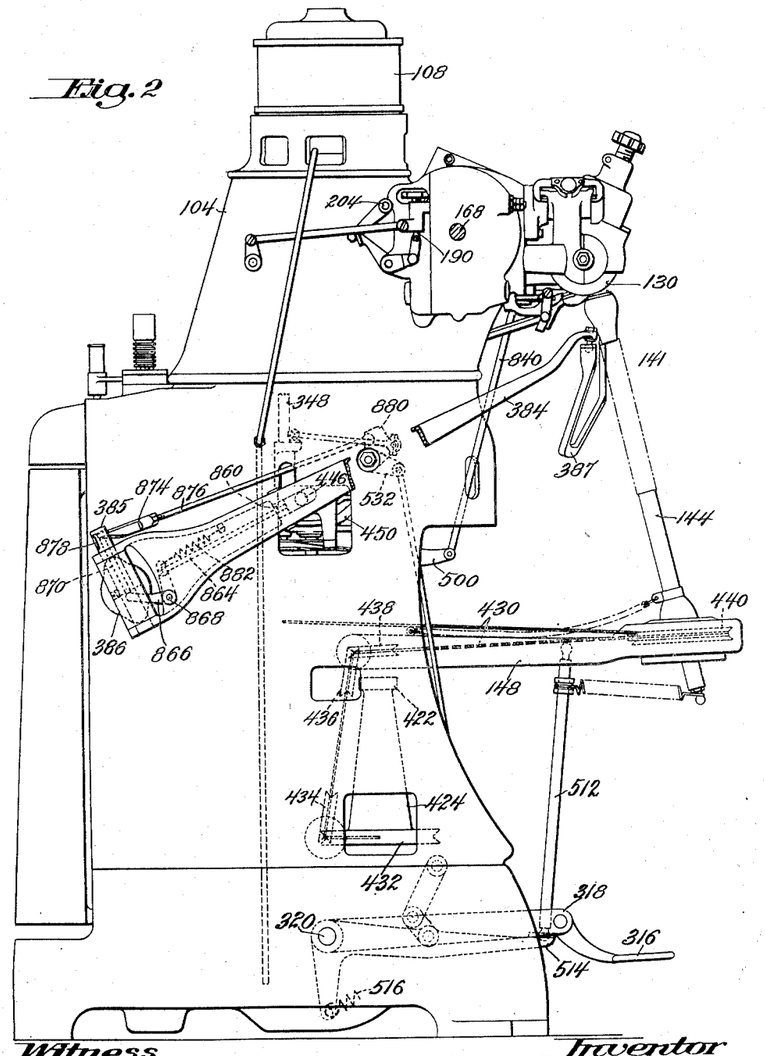
Fig. 2 is a view in left-side elevation of the machine shown in Fig. 1.
Figure 3:
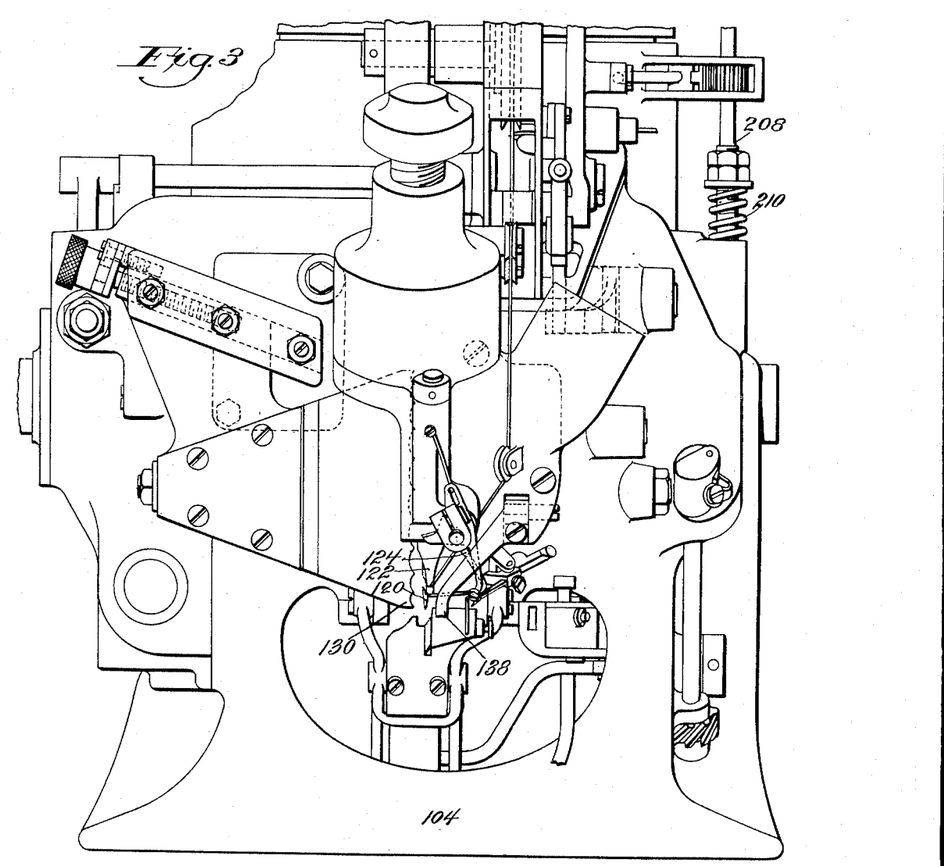
Fig. 3 is an enlarged detail view in front elevation of the machine head illustrating particularly the relation of the shoe operating devices including the inseam trimming cutter and the shoe positioning devices including particularly the channel guide.

Feeding movements are imparted to the shoe by means of a feed lever 384 (see Figs. 2, 8 and 10) located on the left side of the machine outside of the machine casing, and pivotally supported at its rear end for lateral swinging movements on a cross pin 385 on a lateral rock shaft 386 journalled in a bearing at the rear of the machine. At its forward end the feed lever 384 is connected by means of a curved link 387 with the toe support 142 of the jack.

Longitudinal pitch tipping movements are imparted to the jack by means of a pitch cam lever 388 (see Figs. 1 and 11) having a cam roller for engagement with a cooperating pitch cam 394 on the pattern cam shaft. The pitch cam lever is connected by a forwardly extending link 396 to a lateral extension of the support 380.

Forward and back or roll tipping movements are imparted to the jack by means of a roll cam lever 402 (see Figs. 1 and 11) arranged to be acted upon by a roll cam 406 on the pattern cam shaft 240, and connected by a link 408 to an intermediate portion of the frame 382.

The mechanism for imparting turning movements to the jack comprises a turn cam lever 414 supported on the pivot shaft 390 above the roll cam lever 402, and provided with a roller 416 arranged to engage with a cooperating turn cam 418. A forward extension of the turn cam lever 414 has formed thereon a gear segment 420 which meshes with a pinion 422 (see Fig. 11) carried on the upper end of a cone-shaped pulley member 424. Rotational movement is imparted to the jack from the pulley member 424 by means of a cord 430 which is secured at one end to a pulley 432 formed on the lower end of the member 424, and thence passes around an idler pulley 434 on the frame 382, an idler pulley 436 on the support 380, an idler pulley 438 on the jack supporting arm 148, and around a wheel 440 supported to turn with the jack spindle 144. Thence the cord extends rearwardly over an idler pulley 442 and downwardly to a weight 444, which serves to maintain an adequate tension on the cord.

The mechanism for actuating the feed lever 384 of the machine for imparting feeding movements to the jack, will be described in connection with Figs. 6, 7, 8, 9 and 10 of the drawings. Feeding movements are imparted to the feed lever 384 by means of a link 446 connected with a second link 448 which is in turn connected to the forward extension of a feed cam lever 450 supported on the pivot shaft 390.

A feed cam roller 452 on the lever 450 engages a feed cam 454 on the pattern cam shaft of the machine. Links 446 and 448 are arranged at an acute angle with relation to one another, being pivotally connected together by a pivot pin 456, and to the free end of a double link 458 which serves as a guiding link for the pivotal connection 456 of the links 446, 448. The link 458 is fulcrumed at 460 on a fulcrum carrying frame lever 462 mounted to turn on an axis 464. Motion is transmitted from the feed cam lever 450 through links 448 and 446 to the feed lever 384, the extent of this motion being determined in accordance with the direction of movement imparted to the pivotal connection 456 of the guiding link 458. The fulcrum carrying frame lever 462 is held in locked and adjusted position during the operation on the shoe by mechanism comprising a laterally extending rod 466 connected at one end by means of a connecting pin 468 to the fulcrum carrying frame lever 462, and at its other end arranged to be engaged by a locking device indicated generally in dotted lines at 470 in Fig. 6. During operation on the shoe the locking device is operative to support the fulcrum carrying frame lever 462 in locked position. The placing of a new shoe on the jack acts to release the locking device 470 so that the fulcrum carrying frame lever 462 is unlocked and adjustment of the mechanism for actuating the feed lever can be made by movement of the jack to starting position. The fulcrum carrying frame lever is locked in position on starting the machine through connections controlled from the starting treadle.

The jacked shoe is forced yieldingly upwardly into operating position with relation to the shoe sewing mechanism during the operation about the shoe, and is then moved positively downwardly out of engagement therewith in stopping the machine, by mechanism which comprises a vertically extending jack supporting rod 512 (see Figs. 1, 2 and 11) connected at its upper end by means of a universal joint with the under side of the jack supporting arm 148, and at its lower end by means of another universal joint to the forwardly extending arm of a bell-crank lever 514 which is loosely supported to turn on the pivot shaft 320. A pair of heavy tension springs 516 connected at one end to the downwardly extending fork arms of the bell-crank 514 and at their other ends to the machine frame, tend to move the lever 514 and supporting rod 512 upwardly to maintain the jacked shoe yieldingly in engagement with the sewing mechanism.

The channel guide 138 riding in the stitch receiving channel provides a principal means for positioning the jacked shoe with relation to the shoe operating instrumentalities during the progress of the operation about the sole margin of the shoe. As previously noted, the jacked shoe is urged yieldably upwardly and outwardly against the channel guide which thus forms a focal point with reference to which the turning and tipping movements of the shoe take place to present successive portions of the shoe to the operating devices as the operation progresses around the margin of the shoe sole. The organization of the machine including the channel guide to provide a focal point for such turning and tipping movements is such as to enable separated portions of the sole margin of the shoe to be presented simultaneously in proper relation to each of the respective lasting, sewing and inseam trimming devices. In the illustrated form of the invention, the channel guide is located to engage against the sewing rib as closely as possible to the reciprocating needle in the line of feed. The pattern cams of the machine for controlling the turning, tipping and feeding movements of the jacked shoe are particularly constructed and arranged for this position of the channel guide to cause the sole margin of the shoe to be accurately positioned for the operation of the trimming knife as well as the lasting and sewing devices as the point of operation progresses about the shoe.

Figure 4:
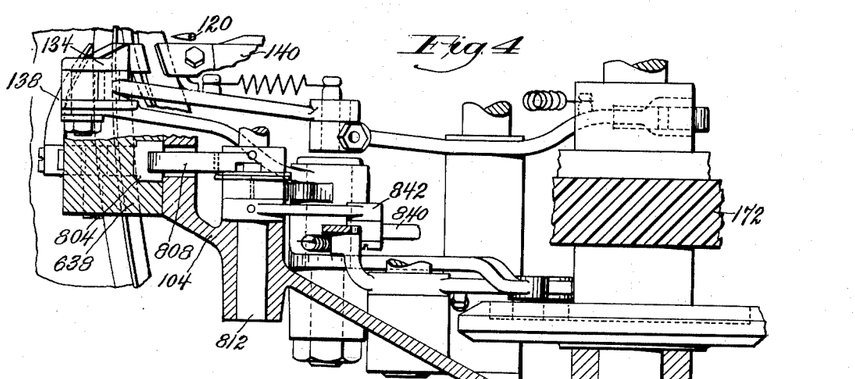
Fig. 4 is a fragmentary plan view partly in section illustrating particularly the channel guide operating mechanism.
Figure 5:
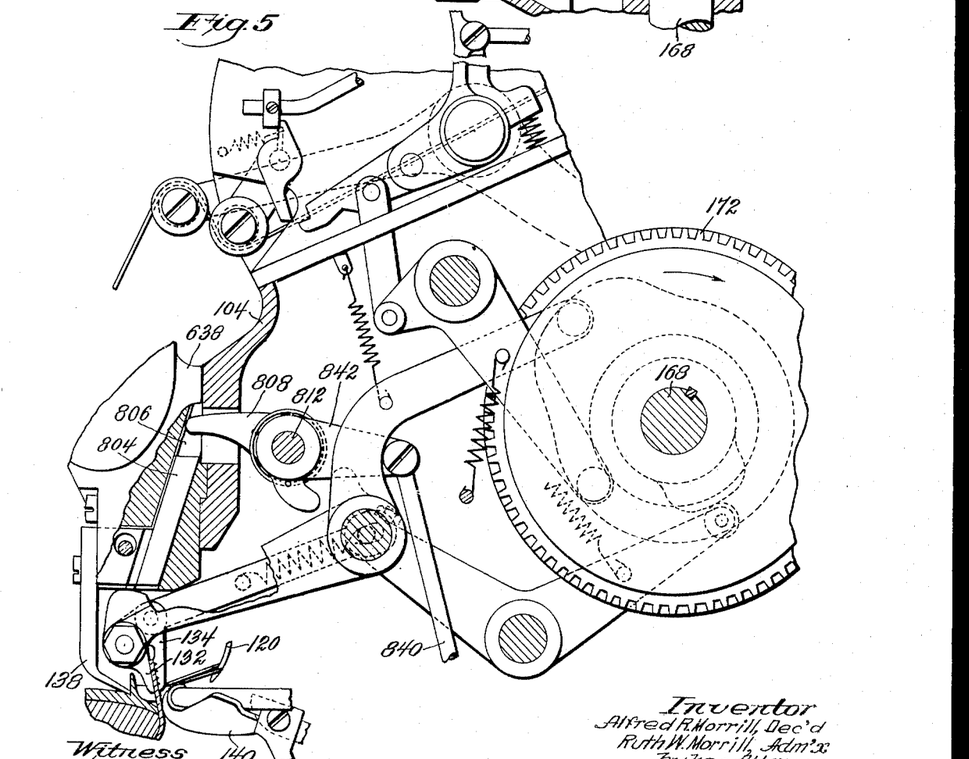
Fig. 5 is a view in right side elevation of substantially the parts shown in Fig. 4.

The channel guide 138 is arranged to be automatically adjusted vertically with relation to the stitch forming devices including the curved hook needle 120, and also with relation to the trimming knife 130 to vary the depth at which the sewing and inseam trimming operations take place during the progress of these operations about the sole margin of the shoe. In the starting position of the machine, the channel guide is located in an abnormally depressed position, and is then moved upwardly to a normal operating position as the point of the sewing and inseam trimming operations moves away from the breast line of the heel. As the sewing and inseam trimming mechanisms approach the breast line of the heel at the end of the combined operation about the shoe, the channel guide is again moved to its abnormally low position. The movement of the channel guide in this manner serves to compensate for the dislocation of the welt and upper, which may be caused by the bunching of material at the breast line of the heel, to insure the proper location of the initial and final stitches of the seam and the correct trimming of the terminal portions of the inseam held together by these stitches. The channel guide 138 is formed on the lower end of a vertically arranged slide 804 (see Figs. 4 and 5) mounted in a guideway 806 in the block 638 forming part of the operating head 104. The vertical position of the channel guide is controlled by means of a forwardly extending channel guide control lever 808 which is secured to rock shaft 812 and forms part of the channel guide control mechanism hereinafter to be described.

The positioning of the channel guide 138 is automatically controlled in timed relation to the transfer of the point of operation about the shoe by means of mechanism which comprises a cam 830 on the pattern cam shaft 240 (see Fig. 1), and a cam lever 832 which is supported on the vertical pivot shaft 390 and is provided with a cam roll 834 for engagement with the cam 830. The cam lever 832 is connected by means of a link 836 with one arm of the bell-crank lever 590, the other arm of which is connected by a link 840 with a lever arm 842 rigidly secured to the horizontally extending rock shaft 812 which has secured thereto the forwardly extending channel guide control lever 808. Rocking movement of the rock shaft 812 and control lever 808 to the extreme position in a counterclockwise direction, acts to depress the slide 804 and channel guide 138 to the abnormally low position.

The operation of the mechanism for positioning the channel guide 138 is as follows: In the stop position of the machine illustrated in Fig. 1 of the drawings, the rock shaft 812 has been shifted to the extreme limit of its movement in a counterclockwise direction in which the channel guide control lever 808 is engaged with and has depressed the channel guide 138 to its extreme low position. When the machine is started, and during the formation of the initial stitches of the seam, the rock shaft 812 is gradually rocked in a clockwise direction from the abnormally low position above noted, causing the channel guide to be gradually raised to normal operating position. During the sewing and trimming of the final stitches of the seam at the completion of the operation of the shoe, the rock shaft 812 is again rocked in a counterclockwise direction to gradually depress the channel guide to its extreme low position.

In the illustrated machine, means are provided for continuing the feeding movement of the shoe after the sewing operation has been completed to relatively advance the trimming knife for trimming the latter portion of the inseam held together by the final stitches of the seam. As previously noted, the trimming knife is located in relation to and is spaced from the sewing mechanism so that the trimming operation follows the sewing operation around the sole margin of the shoe. At the end of the sewing operation, the sewing mechanism is brought to rest in its normal stop position with the needle withdrawn from the work and with a portion of the thread leading from the looper to the work held by the gripping action of the thread finger and associated gripper for the starting of a new seam and with the welt severed. The relative advancing movement thus imparted to the inseam trimming knife is employed also to sever the thread close to the work. The thread extending from the work is held tautly by the thread finger and engaging thread gripper at a rising angle from the sewing rib and in substantially the same vertical plane therewith so that the thread will with certainty be brought into the path of and be severed by the rotating inseam trimming knife.

Figures 8, 9:
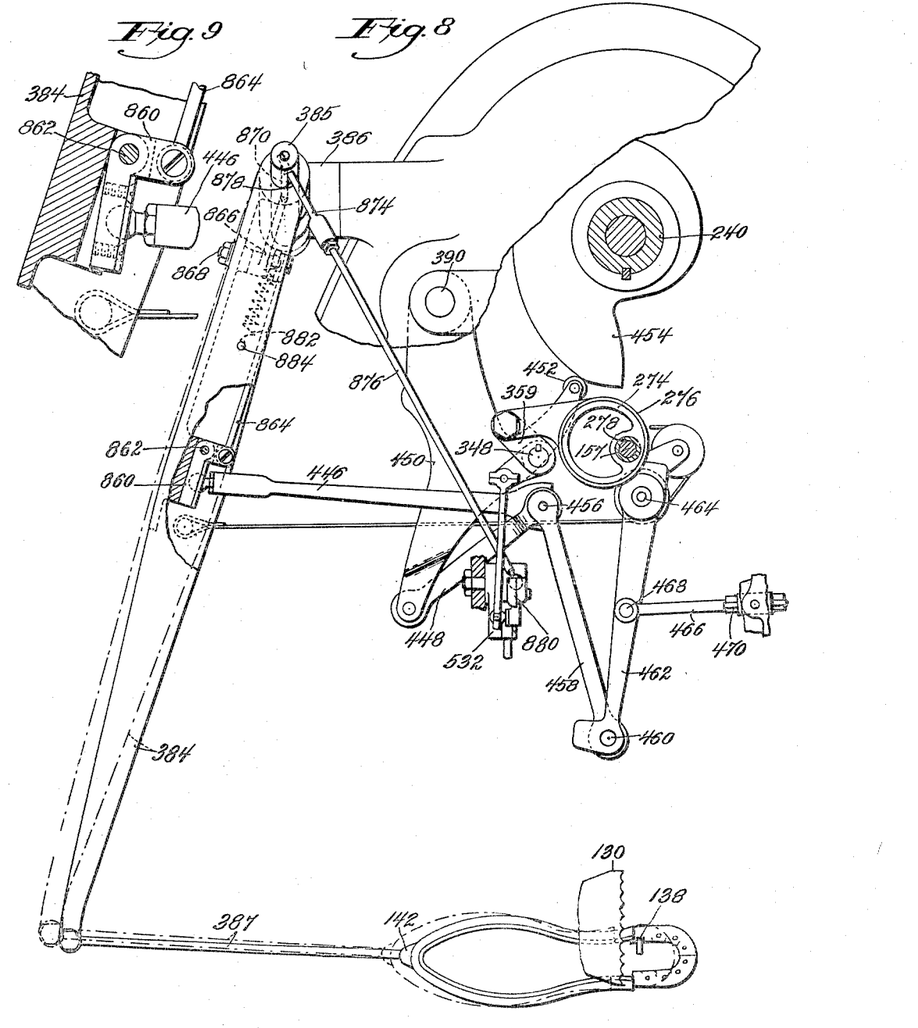
Fig. 8 is a fragmentary plan view showing particularly the feed lever and associated mechanism for imparting feeding movement to the jack.
Fig. 9 is an enlarged detailed sectional view of the connection between the feed lever and the associated operating link shown in Fig. 8, but with the parts in extended position taken at the completion of the added increment of feeding movement employed to finish trim the inseam.
Figure 10:
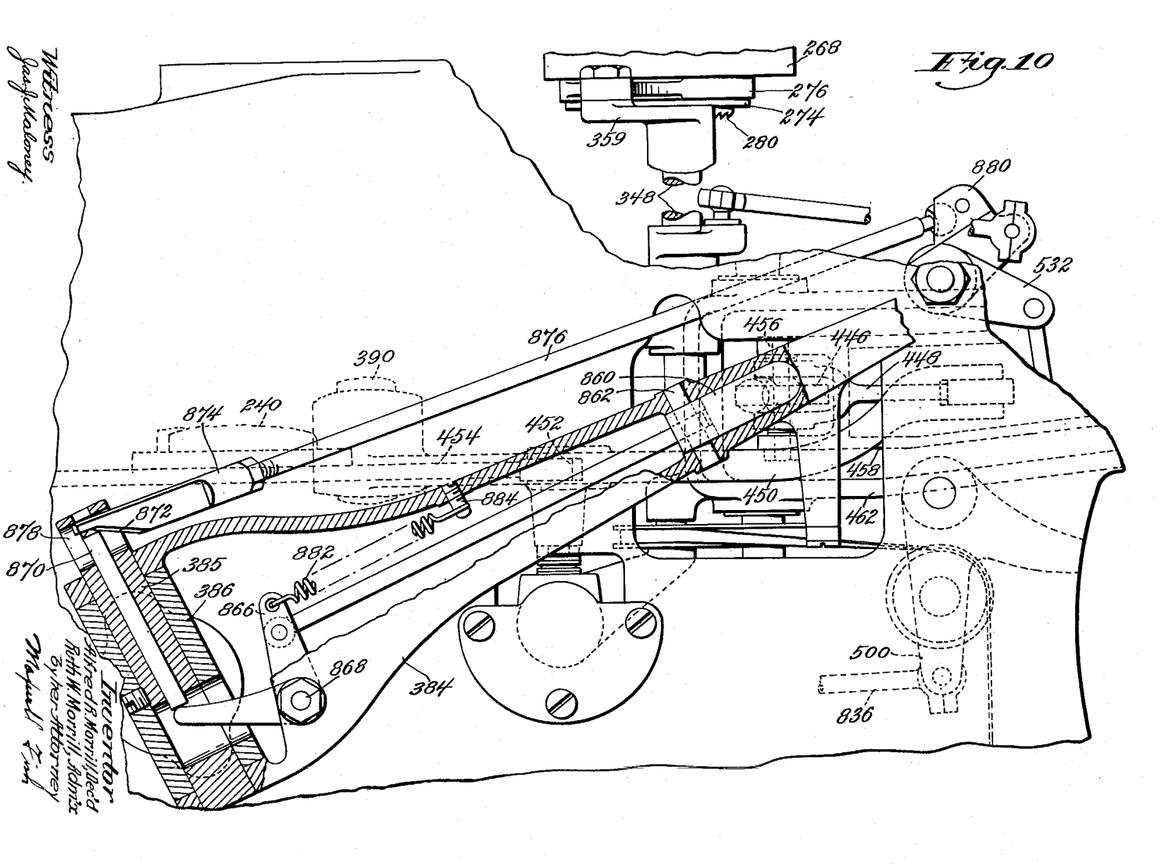
Fig. 10 is a view in left-side elevation of the parts shown in Fig. 8, but with a portion of the feed lever broken away and sectioned to illustrate particularly the mechanism for imparting the added increment of feeding movement to the jack to finish trim the inseam upon the completion of the operation about the shoe.

In the illustrated automatic machine, mechanism is provided which is adapted to impart an additional advancing movement to the shoe only after the several operations associated with the discontinuing of the sewing operation have been performed, but before the shoe has been released from its position in engagement with the channel guide and while the jacked shoe remains under the control of the pattern cams to insure the proper positioning of the shoe with relation to the inseam trimming knife during the relative advancing movement of the shoe to complete the inseam trimming operation. The mechanism for relatively advancing the shoe to complete the trimming operation comprises connections controlled from the eccentric control mechanism for imparting an additional increment of movement to the feed lever 384 of the machine to finish the trimming operation thereon. The connections referred to, as best shown in Figs. 8 to 10 inclusive, comprise a bell-crank lever 860 which is mounted on a pivot pin 862 on the feed lever 384, and has a ball and socket connection with the feed link 446. It will be evident from an inspection particularly of Figs. 8 and 9, that a rocking movement imparted to the bell-crank 860 to the position shown in Fig. 9, will have the effect of moving the feed lever 384 leftwardly to the dot-and-dash position illustrated in Fig. 8, thus causing the inseam trimming knife 130 to be advanced to finish-trim the inseam. The operating connections for the bell-crank supplemental feed lever 860 comprise a link 864 connected at one end to the bell-crank 860 and at its other end to a bell-crank 866 carried on a pivot pin 868 in the base of the feed lever 384. The free arm of the bell-crank 866 is arranged to engage against one end of a plunger 870 mounted in an axial bore formed in the cross pin 385 for the feed lever 384. The plunger 870 bears at its other end against a cammed surface 872 on a sliding element 874 which is mounted on one end of a link 876 and is arranged for sliding movement through a slot 878 in the upper end of the cross pin 385. The link 876 is connected at its other end by means of a ball and socket connection to an arm 880 forming a rigid part of the bell-crank lever 532 of the connections from the machine stop motion eccentric for straightening the toggle connections to depress the jack. A tension spring 882 connected at one end to the bell-crank lever 866 and at its other end to a pin 884 on the feed lever 384 tends to move these connections in a direction to maintain the auxiliary feed bell-crank 860 in its fully seated position as shown in Fig. 8, and with the bell-crank 866 biased in a direction to retain the plunger 870 in its most fully extended position.

The invention having been described, what is claimed is:

1. In a machine for operating upon shoes, shoe operating means arranged for performing an operation about the sole margin of a shoe, a shoe supporting jack, supporting and actuating mechanism for the jack, including a pattern feed cam, a feed lever connected to feed the jack, a pivotal support for the feed lever, actuating connections from the feed cam including an extensible link connection with the feed lever, and means acting when rendered operative to impart an added increment of feeding movement to the feed lever comprising an actuating member supported with the feed lever on said pivotal support, an operating connection on the feed lever between said actuating member and extensible link connection, and control means on the machine for operating said actuating member.

2. In a machine for operating upon shoes, shoe operating means arranged for performing an operation about the sole margin of a shoe, a shoe supporting jack, supporting and actuating mechanism for the jack including a pattern feed cam, a feed lever connected to feed the jack, a pivotal support on which the feed lever is mounted to turn, actuating connections from the feed cam including an extensible link connection with the feed lever, driving and stopping mechanism for the machine including an auxiliary mechanism rendered operative in stopping the machine, and means controlled from said auxiliary mechanism in stopping the machine for imparting an added increment of feeding movement to the feed lever comprising an actuating member supported with the feed lever on said pivotal support, an operating connection on the feed lever between said actuating member and extensible link connection, and additional connections from said auxiliary mechanism for acting upon said actuating member.

3. In a machine for operating upon shoes, shoe operating means arranged for performing an operation about the sole margin of a shoe, a shoe supporting jack, a system of supporting and actuating levers for the jack adapted for imparting positioning movements to the jack, driving and stopping mechanism for the machine including an auxiliary mechanism rendered operative in stopping the machine, a pattern shaft and cams thereon for controlling said levers and jack supported thereby to transfer the operation about the sole margin of the shoe, said levers including a feed lever, a pivotal support for the feed lever, a link and an extensible lever connecting the link with the feed lever for moving the feed lever about its pivot, an axially movable actuating member supported coaxially with the feed lever on said pivotal support, and control means for said actuating member, an operating connection on the feed lever between said actuating member and said extensible lever connection, and means connecting said actuating member to be actuated by said auxiliary mechanism to impart an additional increment of movement to the jack when the machine is stopped.

4. In a machine for operating upon shoes, shoe operating means arranged for performing an operation about the sole margin of a shoe, a shoe support, actuating mechanism for the shoe support including a feed lever, a pivotal support on which the feed lever is mounted to turn, a feed cam actuating connections including an extensible link connection with the feed lever, driving and stopping mechanism for the machine including a part arranged to be moved after the machine is stopped, and connections from said part for actuating the extensible link connection to impart an added increment of feed to the shoe comprising a plunger coaxial with the pivotal support, a cammed sliding element actuated by said part to shift the plunger, a bell-crank, and a link connection actuated by said plunger to operate the extensible link connection.

5. In a machine for operating upon shoes, an inseam shoe sewing mechanism including a needle for sewing the upper to the welt and insole of the shoe supported on a last, and means for feeding the shoe to transfer the operation about the shoe sole, an inseam trimming mechanism including a knife operable to trim a sewn portion of the insole held together by completed stitches of the seam, a guide engaging the shoe to control the depth of the sewing operation and of the trimming cut with relation to the shoe sole, a device for relatively adjusting the positions of the guide and sewing and trimming mechanisms to vary the depth of the trimming cut, a driving and stopping mechanism for the machine including means operable at the end of an operation about the shoe to discontinue the sewing operation, and thereafter to impart an additional increment of feed to the work, a pattern mechanism in the machine timed with relation to the progress of the operation about the shoe, and connections responsive to the dictation of said pattern mechanism for controlling said adjusting device to decrease the depth of trimming cut during the sewing of the final stitches of the seam, and during said added increment of feed to finish trim the lasted seam.

6. In a machine for operating upon shoes, an inseam shoe sewing mechanism including a needle for sewing the upper to the welt and insole of the shoe supported on a last, an inseam trimming mechanism including a knife operable to trim a sewn portion of the insole held together by completed stitches of the seam, a channel guide engaging the shoe adjustable to control the depth of the sewing operation and of the trimming cut with relation to the shoe sole, a driving and stopping mechanism for the machine including means operable to stop the sewing operation, a shoe supporting jack, supporting and actuating mechanism for the jack to transfer the sewing and trimming operations about the sole margin of the shoe, a pattern mechanism in the machine timed with relation to the progress of the sewing and trimming operations about the shoe operable during the sewing of the final stitches of the seam to depress the channel guide and upon stopping the sewing mechanism to impart to the jack an added increment of feed to finish trim the lasted seam with the channel guide depressed.

7. In a machine for operating upon shoes, an inseam shoe sewing mechanism including a needle for sewing the upper to the welt and insole of the shoe supported on a last, an inseam trimming mechanism comprising a trimming knife arranged to trim the sewn inseam, a guide engaging the shoe to control the depth of the trimming cut with relation to the shoe sole, supporting means on the machine on which the guide is adjustable for relatively adjusting the positions of the guide and trimming mechanism to vary the depth of the trimming cut, and a pattern mechanism in the machine timed with relation to the progress of the trimming operation about the shoe, and connections responsive to the dictation of the pattern mechanism operative upon the starting of an operation upon the shoe to relatively adjust the positions of the guide and trimming mechanism to increase the depth of trimming cut and operative during the trimming of the final stitches of the seam to relatively adjust the positions of the guide and trimming mechanism to decrease the depth of trimming cut.

RUTH W. MORRILL,
*Administratrix of the estate of Alfred R. Morrill, deceased.*

REFERENCES CITED

The following references are of record in the file of this patent:

UNITED STATES PATENTS

| Number | Name | Date |
|---|---|---|
| 488,591 | Warren | Dec. 27, 1892 |
| 514,741 | Warren | Feb. 13, 1894 |
| 558,379 | French et al. | Apr. 14, 1896 |
| 1,920,501 | Goddu | Aug. 1, 1933 |
| 2,323,347 | Morrill | July 6, 1943 |
| 2,529,095 | Morrill | Nov. 7, 1950 |